United States Patent [19]

Opelt

[11] Patent Number: 4,868,681
[45] Date of Patent: Sep. 19, 1989

[54] METHOD AND ARRANGEMENT FOR RECORDING AND REPRODUCING A DATA PACKET TRANSMITTED IN A TELEVISION SIGNAL

[75] Inventor: Christian Opelt, Veitsbronn, Fed. Rep. of Germany

[73] Assignee: U.S. Philips Corporation, New York, N.Y.

[21] Appl. No.: 291,703

[22] Filed: Dec. 29, 1988

Related U.S. Application Data

[63] Continuation of Ser. No. 87,588, Aug. 20, 1987, abandoned.

[30] Foreign Application Priority Data

Aug. 30, 1986 [DE] Fed. Rep. of Germany ....... 3629657

[51] Int. Cl.$^4$ .............................................. H04N 5/76
[52] U.S. Cl. ................................. 358/335; 358/142; 360/33.1; 360/48; 369/59
[58] Field of Search ............... 358/142, 143, 144, 145, 358/146, 147, 335, 336; 360/33.1, 39, 48; 370/94, 94 U, 112; 369/59

[56] References Cited

U.S. PATENT DOCUMENTS 4,589,109 5/1986 Chambers ........................... 358/144
4,757,498 7/1988 Murray ................................. 370/94

FOREIGN PATENT DOCUMENTS

0243739A2 4/1987 European Pat. Off. .

Primary Examiner—Robert L. Richardson
Attorney, Agent, or Firm—Michael E. Marion

[57] ABSTRACT

From a television signal, a data packet transmitted within each line in time multiplex with the picture information is separated by means of a time gate, while in addition to each data packet, a version delayed in time is formed, all the data packets are subjected to a multilevel coding and the information associated with a line and present in multiple are recorded relatively offset in time on different oblique tracks of a record carrier.

7 Claims, 6 Drawing Sheets

METHOD AND ARRANGEMENT FOR RECORDING AND REPRODUCING A DATA PACKET TRANSMITTED IN A TELEVISION SIGNAL

This is a continuation of application Ser. No. 087,588, filed Aug. 20, 1987, now abandoned.

BACKGROUND OF THE INVENTION

The invention relates to a method of and an apparatus for recording and/or reproducing a data packet transmitted in a television signal in time multiplex with the picture information.

The German patent application P 36 13 798.7 of 24-04-'86, hereby incorporated by reference, discloses a method of recording satellite television signals. In this method, the input signal is processed with the use of a memory in such a manner that two kinds of time gaps are obtained, the first of which occurs at line frequency, and the second of which occurs at field frequency. For this purpose, successive lines of the satellite television signal are cyclically supplied to n memory units of the memory for time expansion. The time-expanded signal is distributed over k channels. Synchronous pulses are formed in the gaps occurring at line frequency. The time-expanded signals are recorded by means of the oblique track method on k parallel tracks of a magnetic tape, while during the gaps that occur at field frequency, the head change-over takes place. The time-expanded signal is distributed over the k channels in such a manner that each channel contains alternately U and V components of the chrominance signal of the satellite television signal. If it is ensured that the reading processes associated with the individual channels begin and terminate at the same time, a drop-out compensation is possible during recording. In this case, the information disturbed as a result of a drop-out is replaced by an information from the other channel. Consequently, also in the case of a drop-out, a colored picture of half vertical resolution can be obtained.

Furthermore, it is already known, for example, from DE PS 3227373 to combine words consisting of binary signal elements to multi-bit sample values and to record signals stepped as quantizing signals after a digital-to-analog conversion by means of a video recorder. Summary of the Invention The invention has for its object to provide a method of recording a data packet transmitted in a television signal in time multiplex with the picture information, which method permits of obtaining a drop-out compensation on the reproduction side.

The advantages of the invention reside in the fact that a drop-out compensation can be effected in a data packet recorded by means of the method according to the invention. This is essentially achieved by first separating the data packet from the television signal, then forming for each packet a plurality of redundant data packets delayed with respect to teach other by time. Each of the redundant packets are then multiplexed in time with respective data packets and subjected to a multi-level coding process. As a result, it is achieved inter alia that in spite of the redundance introduced it is not necessary to make available an additional band width for recording. The multi-level informations obtained thereby are processed so that the informations associated with a line and present in multiple are recorded with time offset on different channels or oblique tracks of a record carrier. During the reproduction of a data packet thus recorded, in the case of a drop-out, the information recorded each time in the other track can be evaluated instead of the disturbed information. Brief Description of the Drawings Further favorable properties appear from an embodiment, which will be described more fully hereinafter with reference to FIGS. 1 to 6.

In the drawings:

FIG. 5 shows a circuit for explanation of the operation of the circuit block 8 of FIG. 4, and, FIG. 5a shows an example of a circuit which can be used to reproduce the data packets stored on the record carrier (prior art FIG. 4 from German patent application No. P 3613798.7).

DETAILED DESCRIPTION OF THE INVENTION

Figure 1:
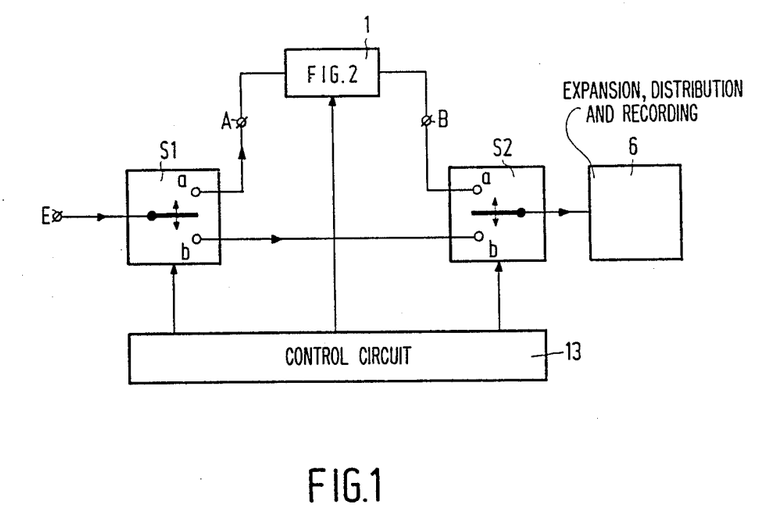
FIG. 1 shows a circuit for explanation of the encoding and recording.

A satellite television signal is supplied to the input E of the circuit shown in FIG. 1, and in this signal the three information blocks contained in each line, i.e. the data packet coded in duobinary form (consisting of data signals, audio signals and synchronous signals), the chrominance information and the luminance information, are transmitted successively in time. One hundred and five (105) bits are used for the transmission of the data packet.

The satellite television signal arrives at the stationary contact of a switch S1, which is controlled by a control circuit 13. During the time interval of each line, in which the data packet coded in duobinary form is transmitted, the movable arm of the switch S1 is connected to the contact a so that the data packet is passed through the circuit point A onto a circuit block 1, which is also controlled by the control circuit 13 and whose operation will be described more fully hereinafter with reference to FIG. 2.

Figure 2:
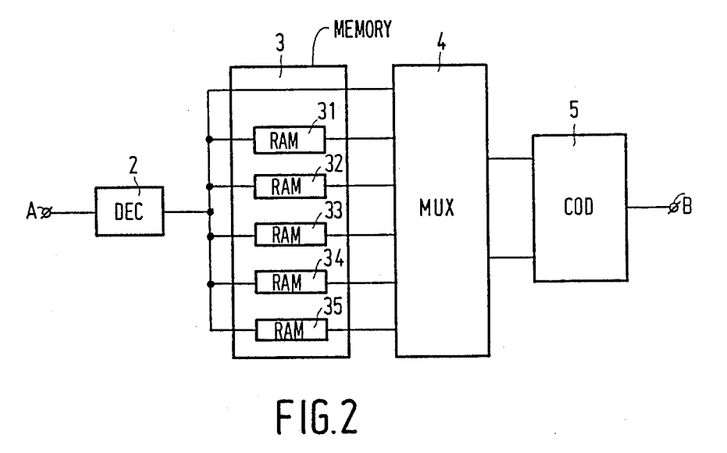
FIG. 2 shows a circuit for explanation of the operation of the circuit block 1 of FIG. 1.

The data packet coded in duobinary form is converted in a duobinary decoder 2 into a binary signal, for example an a non-return to zero (NRZ) signal. This signal is supplied to a memory 3, which in the embodiment shown consists of a direct path and five RAM's (31, ... 35). The object of these RAM's, which are also controlled by the control circuit 13, is to differently delay the successive lines of the data packet converted into a binary form and to make the data information associated with each line available twice at the output of the memory, i.e. at different instants. As a result, redundant data are obtained, which can be used for drop-out compensation on the reproduction side, as will be explained below.

The output signals of the memory 3 are supplied to a multiplexer 4, which is controlled by the control circuit 13 and which passes the output signals of the memory in a given rhythm on to its outputs 4a and 4b. By way of example, the data informations derived from all the odd-numbered lines may be presented at the output 4b at the same time. These informations are supplied simultaneously to a quaternary encoder 5, in which a quaternary signal is formed from the binary informations, which signal is available at the output B of the circuit shown in FIG. 2, and at the point B of the circuit shown in FIG. 1, respectively.

From the point B of the circuit shown in FIG. 1, the data packet subjected to a quaternary coding arrives a circuit via switch S2 which, like S1 has its movable arm in the switching position a as controlled by control circuit 13.

During the time interval of each line, in which the chrominance information and the luminance information are transmitted, the switches S 1 and S 2 are each time in the switching position b so that chrominance information and luminance information are supplied to the circuit 6 without being changed.

Consequently, in each line of the satellite television signal a data packet subjected to a quaternary coding, a chrominance information and a luminance information successively occur at the circuit 6.

Figure 2A:
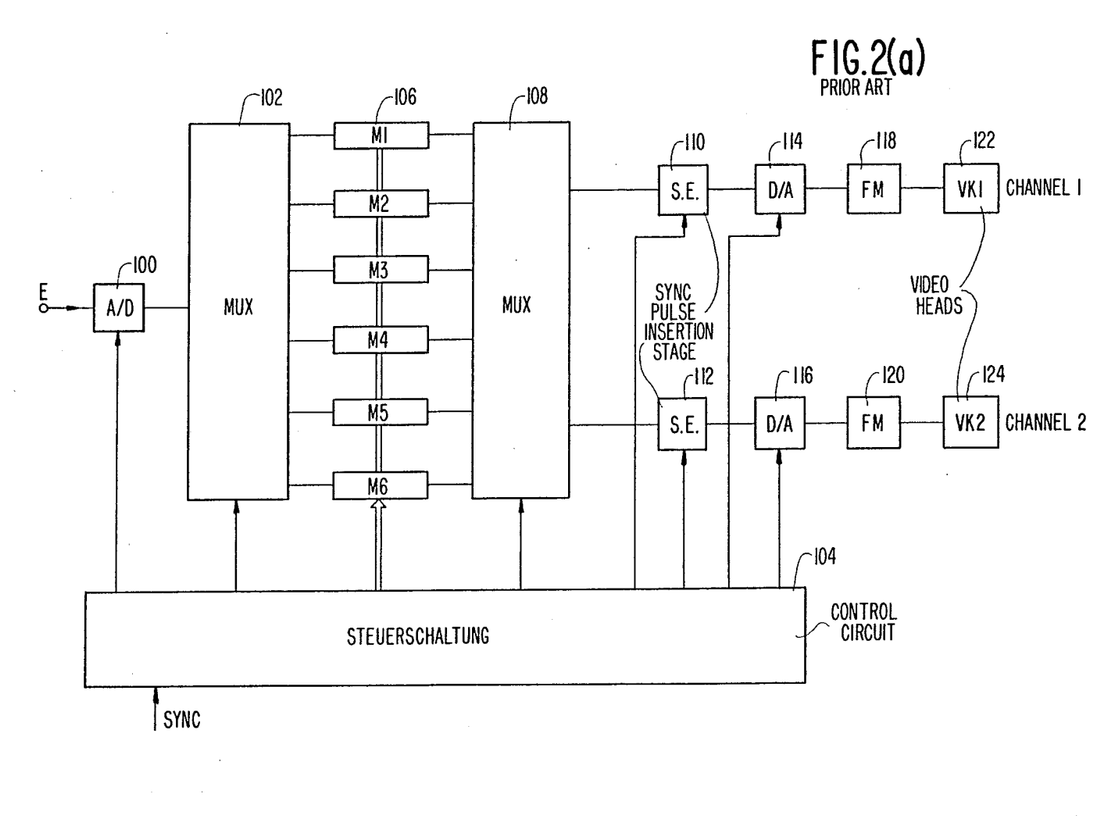
FIG. 2a shows an example of a circuit which can be used to record data packets on two oblique tracks of a record carrier (prior art FIG. 1 from German patent application P 3613798.7).

The circuit 6 may be, for example a circuit as shown in FIG. 1 of German patent application P 3613798 incorporated herein by reference and included as FIG. 2a; In the present case, this circuit ensures that the data packet subjected to a quaternary coding is expanded in time, is distributed over two channels and is recorded on two oblique tracks of a magnetic tape. As described in FIG. 1 of German patent application P 3613798.7 a wide-band satellite-television signal is applied to the input (E) of FIG. 2a. This signal is digitised in an analog-to-digital converter (100). The clock frequency needed for digitisation, which is for example 20.25 MHz, is supplied by a control circuit (104), to which synchronising pulses are applied which are either derived from the input signal or which are available from an external source. The output signal of the analog-to-digital converter (100) is applied to a multiplexer (102), which assigns the consecutive lines of the digitised wide-band signal to storage units (M1, M2, . . . , M6) of a memory (106). In the storage units the signals are time-expanded. Each of the storage units (M1, M2, . . . , M6) is capable of storing the content of one line of the digitised wide-band signal.

The practical construction of the memory (106) is at the discretion of the expert. For example, it is possible to realise the memory (106) in the form of a RAM, which enables the number of lines to be minimised. However, alternatively the memory (106) may be constructed in the form of shift registers.

The multiplexer (102) and the storage units (M1, M2, . . . , M6 are controlled by the control circuit (104). Control of the storage units (M1, M2, . . . , M6) is to be understood to mean the choice of the write clock, the read clock, the write time intervals and the read time intervals. The signal read from the storage units (M1, M2, . . . , M6) are assigned to two channels 1 and 2 by means of a second multiplexer (108), which is also controlled by the control circuit (104).

The two recording channels are identical. Each channel comprises a stage (110 and 112 respectively) for synchronising-pulse insertion, a digital-to-analog converter (114 and 116 respectively), a frequency modulator (118 and 120 respectively), and a video head (122 and 124 respectively) for recording the signal in inclined parallel tracks on a magnetic tape. The stages (110 and 112) for synchronising-pulse insertion and the digital-to-analog converters (114 and 116) are also controlled by the control circuit (104). The clock frequency for the digital-to-analog converters (114 and 116) is, for example, 10.25 MHz.

Figure 3:
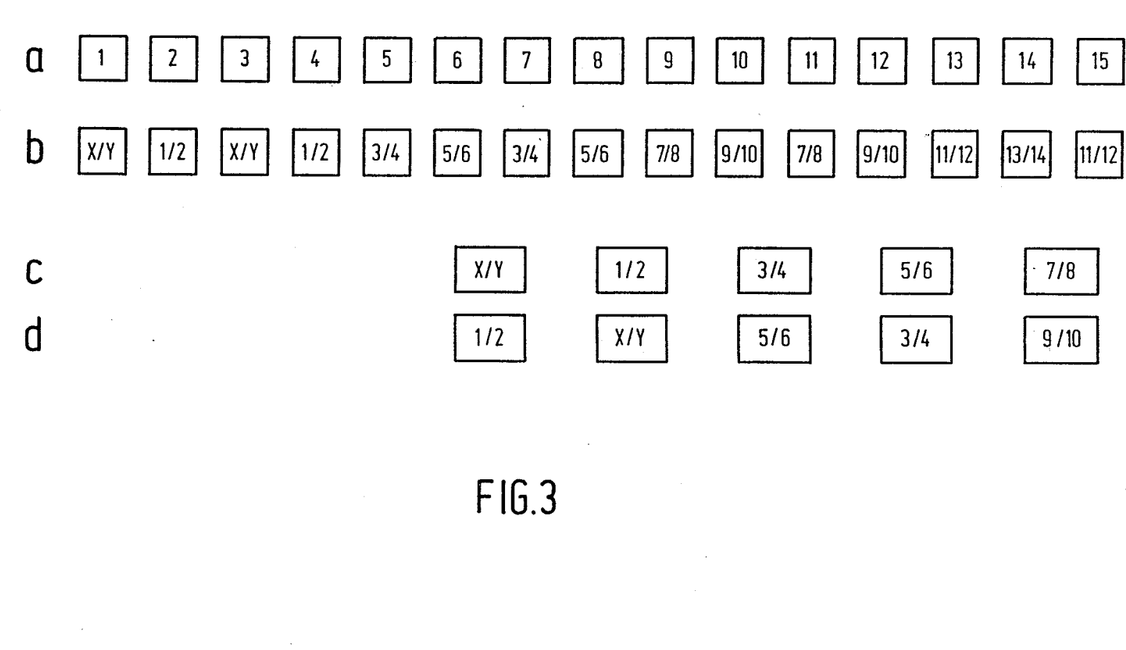
FIG. 3 shows a diagram for illustration of the signals at different circuit points of FIG. 1 and FIG. 2, respectively.

FIG. 3 shows a diagram of illustration of the signals at different circuit points of FIGS. 1 and 2. FIG. 3a shows the data packets of the successive lines separated from the satallite television signal and subjected to a duobinary coding, as they occur at the circuit point A of FIGS. 1 and 2. In the gaps between the data packets of the individual lines, the associated chrominance and luminance informations are transmitted. FIG. 3b shows the data packets subjected to a quaternary coding, as they occur at the circuit point B of FIGS. 1 and 2. The data packets designated by X/Y contain data informations, which were transmitted with the preceding picture. A comparing consideration of FIGS. 3a and 3b illustrates the operation of the circuit shown in FIG. 2, more particularly of the memory 3 and of the quaternary encoder 5. FIGS. 3c and 3d show how the data packets subjected to a quaternary coding are processed by the circuit 6 which can be a recording circuit as described in FIG. 2a from German patent application P 3613798.7 which is incorporated by reference; It more particularly also appears that the data packets are each time present in dual form and are recorded with time offset on different channels for oblique tracks of the magnetic tape.

The signal processing on the reproducing side will be explained, by way of example, hereinafter with reference to FIG. 4. The data packets previously subjected to a quaternary coding and saved on magnetic tape as described above are reproduced by the reproducing heads and are first processed in a processing circuit 7. This circuit may be, for example, a circuit of the kind shown in FIG. 4 of German patent application P 3613798 included herein as FIG. 5a. This circuit essentially ensures that the reproduced data packets subjected to a quaternary coding are compressed in time and are again combined to a monochannel signal. Further, the circuit comprises drop-out detectors, which control the reproduced signals in a known manner with respect to drop-outs. Furthermore, the circuit 7 includes a drop-out memory, which in the present embodiment is in the form of a two-line memory. With a non-disturbed signal, the contents of the drop-out memory are continuously updated, while with a disturbed signal the contents of the drop-out memory is inserted into the signal to replace the disturbed portion; It is achieved by the processing described of the data packets on the reproducing side that such a drop-out compensation can also be effected for the data packets. As described in FIG. 4 of German patent application P 3613798.7, FIG. 5a shows a circuit in which the signal reproduced by the video heads (130 and 132 respectively) is demodulated signal and applied to an analog-to-digital converter (136 to 137 respectively), where it is digitised. By means of a multiplexer (138) the digitised signal is assigned to the storage units (M1, M2, . . . , M6) of a memory (140). The storage units (M1, M2, . . . , M6) serve for time-compression of the reproduced signal. The signals read from the storage units are combined to form a continuous wide-band signal by means of a multiplexer (142). If there is no drop-out the continuous wide-band signal is applied to a digital-to-analog converter (146) via a switch (S6) which is in the switch position a, and is loaded into a drop-out memory (144) having a storage capacity of two lines via a switch (S5), which is also in the switch position a. In the case of a drop-out the two switches (S5 and S6) are in the switch positions b, so that the output of the multiplexer (142) is disconnected form the subsequent circuit sections and the signals stored in the memory (144) are transferred to the D/A converter (146) via the switch (S6). The analog output signal of the D/A converter (146) is applied to the output terminal (A) of the arrangement. For reproduction there is also provided a control circuit (155), which controls the operation of the digital-to-analog converters (136 and 137), the multiplexer (138), the storage unit (140), the multiplexer (142), the drop-out memory (144), the switches (S5 and S6), and the digital-to-analog converter (146). The output signals of the drop-out detectors (148 and 150), which detect the presence of drop-outs in the output signal of the video head (130 and 132 respectively), and the output signals of the separators (149 and 152 respectively), which serve for extracting the synchronising signals from the reproduced frequency-demodulated signal of each channel, are applied to the control circuit (155).

Thus, by means of the synchronising pulses inserted in the line-frequency gaps during recording it is simply possible to achieve time-error compensation by appropriate control the memory.

The output signal of the circuit 7 arrives at the stationary contact of a switch S3, which is controlled by a control circuit 14. During the time interval of each line, in which the data packet subjected to a quaternary coding occurs at the output of the circuit 7, the switch S3 is in the switching position a so that the data packet is passed through the circuit point B' onto a circuit block 8, which is also controlled by the control circuit 14 and whose operation will be described more fully hereinafter with reference to FIG. 5.

The data packet subjected to a quaternary coding is converted in a quaternary decoder 9 into two binary signals, which occur simultaneously at the outputs 9a and 9b of the quaternary decoder. By way of example, the data informations derived from all the odd-numbered lines may be extracted at the output 9a and the data informations derived from all the even-numbered lines may be extracted at the output 9b. The binary signals are supplied to a multiplexer 10, which is controlled by the control circuit 14 and which applies the binary signals in a given rhythm to its output leads. The output leads of the multiplexer 10 are connected to a memory 11, which consists of individual memory units (RAM's) and which is also controlled by the control circuit 14. This memory 11 may be constructed in the same manner as the memory 3 described in connection with the recording (cf. FIG. 2).

However, it is also conceivable to use a memory having a lower storage capacity because the memory 11 solely has for its object to order the output signals of the multiplexer 10 and to pass them in the correct order of succession in time onto the succeeding circuit parts, while inter alia redundance has to be obtained by means of the memory 3 on the recording side.

Figure 4:
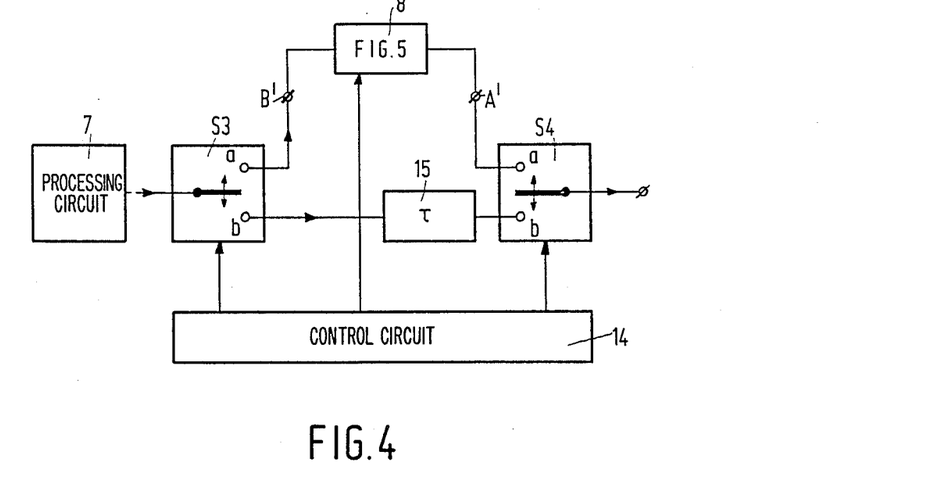
FIG. 4 shows a circuit for explanation of the decoding and reproduction process.
Figure 5:
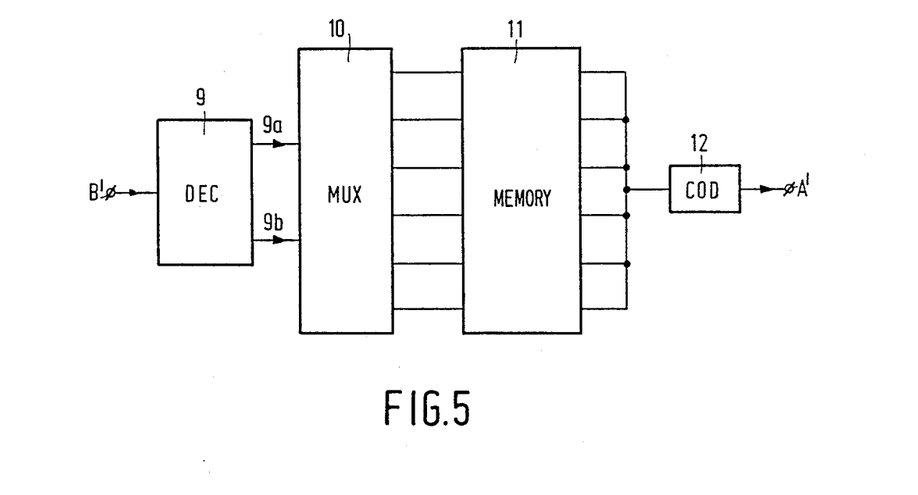
Figure 5A:
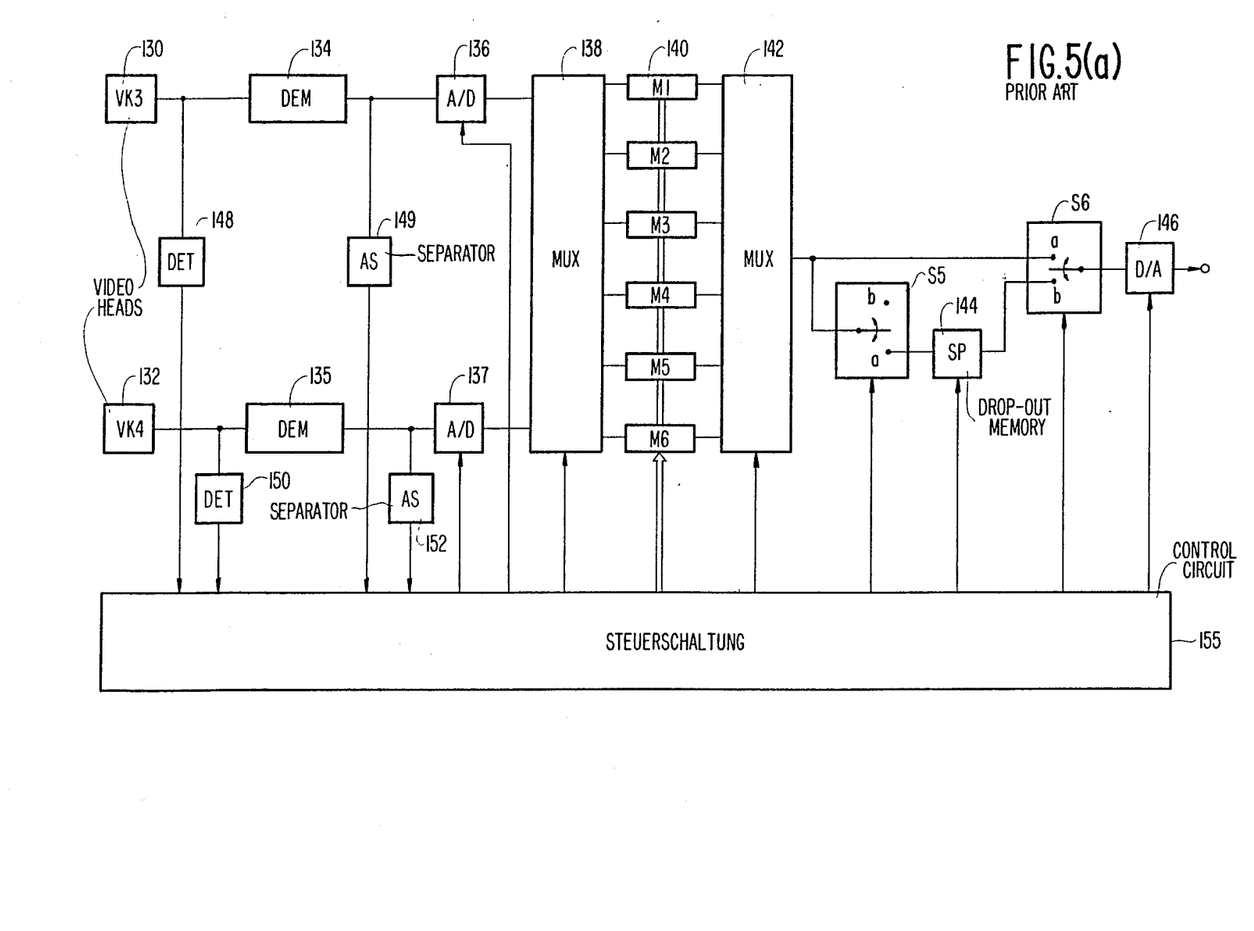

The output signal of the memory 11 arrives at a duobinary encoder 12, which converts the binary signal into a duobinary signal, which then occurs at the output A' of the circuit shown in FIG. 5 and at the circuit point A' of the circuit shown in FIG. 4, respectively.

This duobinary signal is passed via the switch S 4, which is acted upon by the same control signals as the switch S 3 and which is in the switching position a, on to the output of the circuit shown in FIG. 4.

During the time interval of each line, in which the chrominance information and the luminance information are transmitted, the switches S3 and S 4 are each time in the switching position b so that luminance information and chrominance information arrive at the output of the circuit shown in FIG. 4.

The luminance information and the chrominance information are delayed on their way between the switches S 3 and S 4 in a delay element 15 in order to compensate for those delays to which the data packet was subjected during its processing on the recording side and the reproduction side. This delay is of the order of several line periods.

Figure 6:
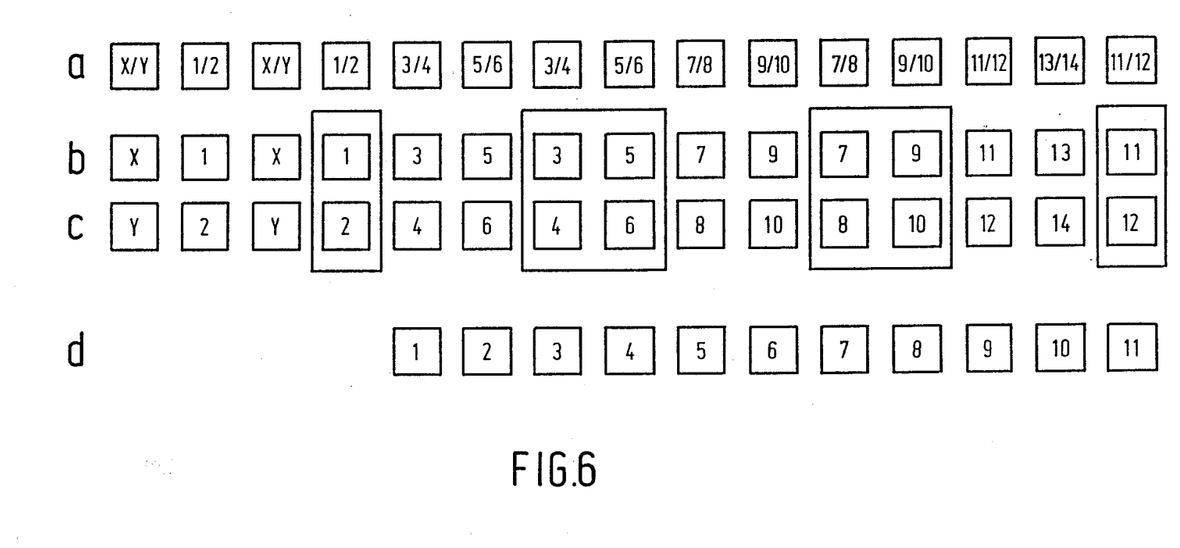
FIG. 6 shows a diagram for illustration of the signals at different circuit points of FIG. 4 and FIG. 5, respectively.

FIG. 6 shows a diagram for illustration of the signals at different circuit points of FIGS. 4 and 5. FIG. 6a shows the data packets subjected to a quaternary coding, as they occur at the circuit point B' of FIGS. 4 and 5. The data packets designated by X/Y in this case also contain data informations which were transmitted with the preceding picture. FIGS. 6b and 6c show the binary signals occurring at the outputs 9a and 9b of the quaternary decoder 9. It appears that the data information associated with each line occurs twice in total. In order to recover the output signal, in the present embodiment, solely the binary informations framed in FIGS. 6b and 6c are used. These informations are brought by means of the memory 11 (cf. FIG. 5) into the correct order of succession and are converted in the duobinary encoder 12 (cf. FIG. 5) into duobinary signals, which — as shown in FIG. 6d — are then available at the output of the circuit.

I claim:

1. A method of recording a plurality of data packets each containing information, which are multiplexed with picture information on a plurality of lines of a television signal, said method comprising the steps of:
   (a) for each line separating a respective data packet from said picture information;
   (b) forming for each respective data packet, a plurality of redundant data packets each available at different instants of time,
   (c) encoding said data packets and said redundant data packets so as to form a plurality of multilevel encoded data packets; and
   (d) distributing said multilevel encoded data packets over two channels for recording, together with said picture information, on a plurality of tracks of a record carrier.

2. A method as claimed in claim 1 wherein, each data packet separated from respective lines of said television signal is converted into a binary signal which is subjected to different time delays forming said redundant data packets which are then multilevel encoded using quaternary coding.

3. A method as claimed in claim 1, wherein said multilevel encoded data packets are recombined with said picture information and reinserted into the television signal prior to said distributing and recording.

4. A method of reproducing a television signal comprising a plurality of data packets which have been multilevel encoded and recorded, together with picture information, on a record carrier, said method comprising:
- (a) reproducing the multilevel encoded data packets and picture information previously recorded;
- (b) deriving from said multilevel encoded data packets, said plurality of data packets; and
- (c) combining said data packets with said picture information so as to form said television signal.

5. The method of claim 4 wherein said multilevel encoding is quaternary encoding and wherein said data packets are duobinary encoded prior to combining with said picture information.

6. Apparatus for recording a plurality of data packets each containing information, which are multiplexed with picture information on a plurality of lines of a television signal, said apparatus comprising:
- (a) means for separating from each line, a respective data packet from said picture information;
- (b) means for forming for each respective data packet, a plurality of redundant data packets each available at different instants of time,
- (c) means for encoding said data packets and said redundant data packets so as to form a plurality of multilevel encoded data packets; and
- (d) means for distributing said multilevel encoded data packets over two channels and means for recording each respective channel, together with said picture information, on a plurality of tracks of a record carrier.

7. Means for reproducing a television signal comprising a plurality of data packets which have been multilevel encoded and recorded together with picture information on a plurality of tracks of a record carrier, comprising:
- (a) means for reproducing the multilevel encoded data packets and picture information previously recorded;
- (b) means for deriving from said multilevel encoded data packets, said plurality of data packets; and
- (c) means for combining said data packets with said picture information so as to form said television signal.

* * * * *